Board & Austin,
Mortising Tool.
No. 26,745. Patented Jan. 10, 1860.
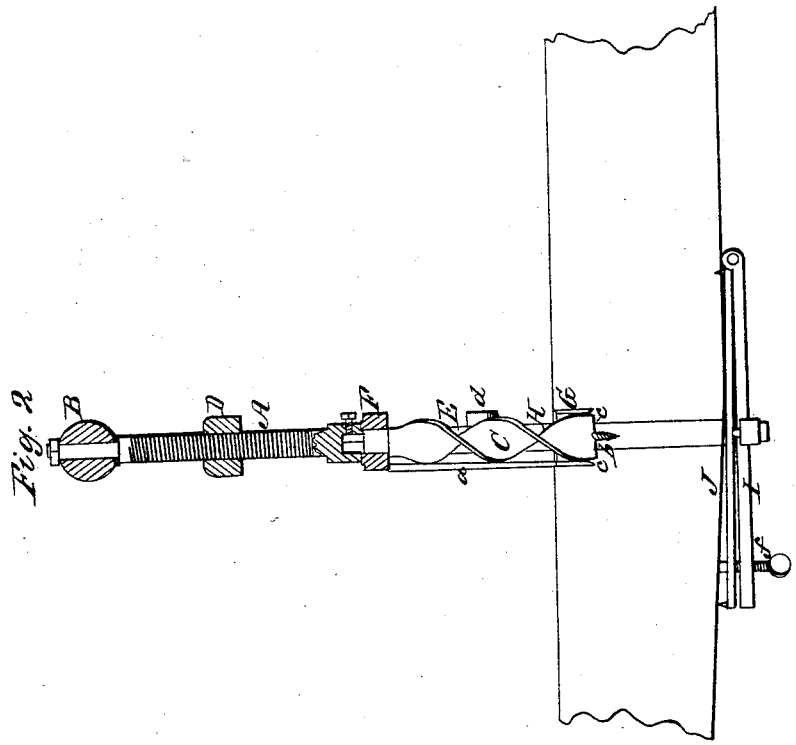
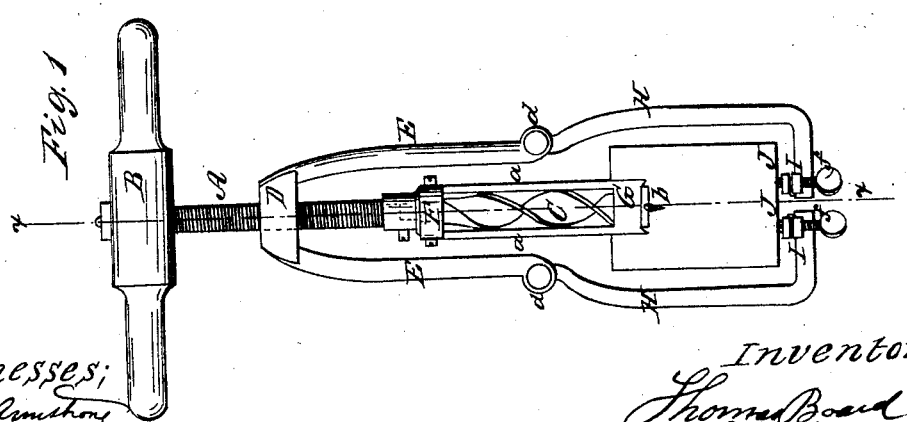
Witnesses:
N. S. Armstrong
H. A. Atkins
Inventors:
Thomas Board
Chas. N. Austin

UNITED STATES PATENT OFFICE.

THOMAS BOARD AND CHARLES N. AUSTIN, OF JACKSON COURT-HOUSE, VIRGINIA.

IMPROVED MORTISING-TOOL.

Specification forming part of Letters Patent No. 26,745, dated January 10, 1860.

*To all whom it may concern:*

Be it known that we, THOMAS BOARD and CHARLES N. AUSTIN, of Jackson Court-House, in the county of Jackson and State of Virginia, have invented a new and Improved Mortising-Tool; and we do hereby declare that the following is a full, clear, and exact description of the same, reference being had to the annexed drawings, making a part of this specification, in which—

Figure 1 is a side view of our invention applied to its work. Fig. 2 is a vertical section of the same, taken in the line $x$ $x$, Fig. 1.

Similar letters of reference indicate corresponding parts in the two figures.

This invention relates to an improvement in the combined auger and chisel tool for forming rectangular holes or mortises at a single operation.

The object of the invention is to obtain a simple means for applying the tool to its work so that it may be readily adjusted and manipulated, and thereby effect a considerable saving in labor, while performing the work in a perfect manner.

To enable those skilled in the art to fully understand and construct our invention, we will proceed to describe it.

A represents a screw-shaft, the outer end of which has a handle B attached and the inner or opposite end an auger C, of the well-known screw form, as plainly shown in both figures. The screw-shaft A works in a nut D, to each side of which a bar E is attached, said bars being nearly parallel with the auger C. (See Fig. 1.)

On the auger C, near its junction with the screw-shaft A, a collar F is placed loosely and allowed to turn freely. To this collar two parallel bars $a$ $a$ are attached at opposite points, the outer ends of said bars being connected with a hollow quadrilateral chisel G, within which the end of the auger C works, the spur $b$ and cutting-edges $c$ $c$ of the auger projecting a trifle below the cutting-edges of the chisel, as shown in both figures.

To the end of each bar E a bent bar H is attached by a joint $d$. The lower parts of these bars are at right angles to their upper parts, as shown clearly in Fig. 1, and to the lower ends of the bars H H bars I I are attached, one to each. These bars I are attached to the bars H H at right angles, and each bar I has a bar J attached to it at one end by a joint $e$, and through the bars I near their opposite ends set-screws $f$ pass.

The implement is used as follows: The piece of timber to be mortised (shown in red) is placed on the bars J, and the latter are adjusted by means of screws $f$ so as to give the timber a proper relative position with the auger C and chisel G, in order that the latter-named parts may cut the hole or mortise in the desired direction. After the timber is properly adjusted the operator turns the screw-shaft A, and the auger C enters the timber and performs its usual functions, while the chisel G in consequence of the feed of the screw is made to follow the auger and cut the hole square. The action of the auger and chisel or the resistance made to them by the timber in the prosecution of their work causes the bars J J to press snugly against the timber and retain the same in proper position while being acted on. This will be fully understood by referring to Fig. 1.

This tool or implement, it will be seen, may be readily adjusted to its work, is quite portable, and will prove a valuable acquisition in framing where the tool requires to be removed and adjusted to the work, instead of the work being adjusted to the tool.

We do not claim the employment or use of the auger and hollow chisel, for that has been previously used; but We do claim as new and desire to secure by Letters Patent—

The combination of the auger C and hollow chisel G with the screw-shaft A, nut D, bars E E H H and I I J J, arranged substantially as and for the purpose set forth.

THOMAS BOARD.
CHAS. N. AUSTIN.

Witnesses:
H. A. ATKINS,
V. S. ARMSTRONG.